(No Model.)  2 Sheets—Sheet 1.

P. McCOMBS.
VELOCIPEDE.

No. 259,411. Patented June 13, 1882.

WITNESSES

INVENTOR
Paul McCombs
By Daniel Breed Attorney.

(No Model.) 2 Sheets—Sheet 2.

P. McCOMBS.
VELOCIPEDE.

No. 259,411. Patented June 13, 1882.

WITNESSES
Fred. G. Dieterich
A. M. Long

INVENTOR
Paul McCombs
By Daniel Breed Attorney.

N. PETERS. Photo-Lithographer, Washington, D. C.

UNITED STATES PATENT OFFICE.

PAUL McCOMBS, OF BEAUMONT, TEXAS.

VELOCIPEDE.

SPECIFICATION forming part of Letters Patent No. 259,411, dated June 13, 1882.

Application filed January 17, 1882. (No model.)

*To all whom it may concern:*

Be it known that I, PAUL McCOMBS, a citizen of the United States, residing at Beaumont, in the county of Jefferson and State of Texas, have invented certain new and useful Improvements in Velocipedes, of which the following is a specification, reference being had therein to the accompanying drawings.

My invention consists of certain new and useful improvements in bicycles, the same being a "double bicycle" or quadrucycle adapted to running on railroads.

Figure 1:
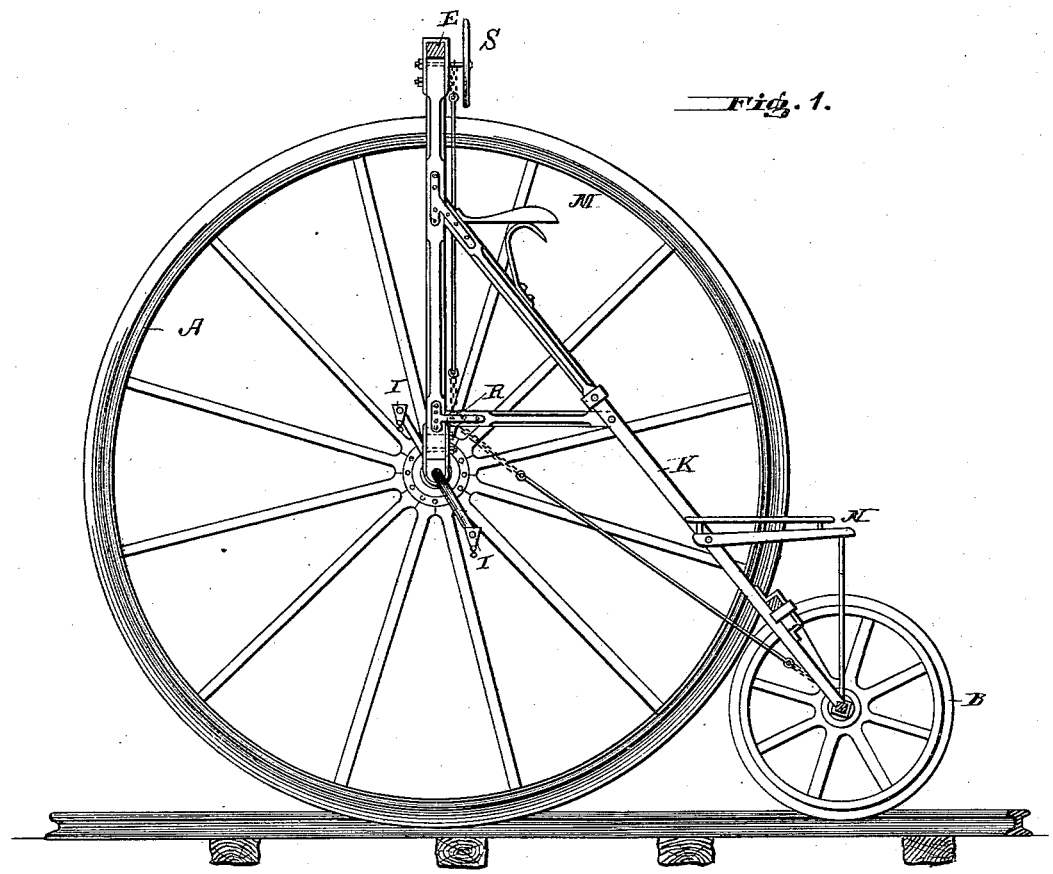
Figure 2:
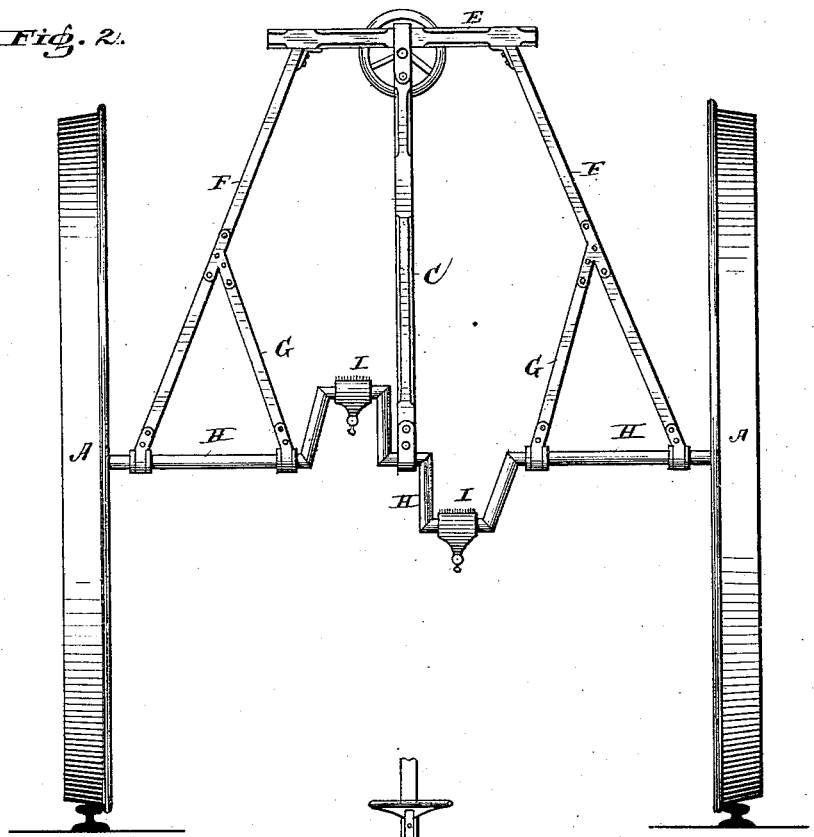
Figure 3:
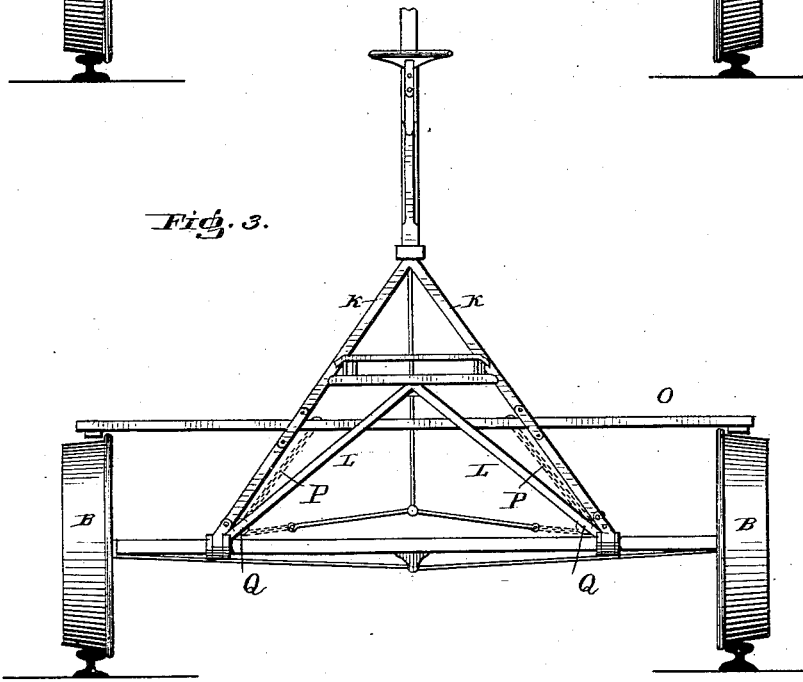

In the accompanying drawings, Figure 1 is a side elevation of my improved machine. Fig. 2 is a front view of the same. Fig. 3 is rear view.

In the drawings, A represents the large front wheels, which are made about five feet in diameter, and act as the driving-wheels, being connected to the rear wheels, B, by the frame-work shown at C E F G, which may be made of wood.

Instead of the common felly and tire, the wheels A have a flange bolted onto the side of the felly, in order to keep the wheels on the track.

The driving-axle H has two cranks, provided with treadles I for the feet of driver. The upright C, and also the braces G and F, all have bearing-surface on the driving-axle H. The cross-bar E is connected securely with the upright C and the two braces F.

The wooden arm or reach K is sawed or slit open at its lower end, the two portions spread apart, and their lower ends fastened to the hind axle, as shown in Fig. 3, and also provided with braces L, thus serving as a frame to support the driver's seat M and the passenger's seat N.

The position of the driver being over the axle H, his weight is thrown directly down upon the driving-axle, with no more labor than in the act of walking; and the front axle is supported in the center by the light skeleton frame, thus avoiding a clumsy construction.

Upon the hind wheels is a brake having bar O, chains P, and pulleys Q and R and windlass-wheel S, thus giving the driver control of the speed on downgrade.

Having described my invention, I claim—

1. The above-described construction and arrangement of skeleton frame, having the upright C and cross-bar E, and the four braces F and G, all having bearings on the driving-axle H, with the driver's seat M directly above the treadles I, or nearly so, substantially as and for the purpose set forth.

2. The arrangement of the brake in connection with the hind wheels, with the chains P and pulleys Q, in combination with the windlass-wheel S, above the driver's seat, substantially as and for the purposes set forth.

In testimony whereof I affix my signature in presence of two witnesses.

PAUL McCOMBS.

Witnesses:
J. F. LANIER,
U. M. GILDER.